Patented Jan. 3, 1933

1,892,848

UNITED STATES PATENT OFFICE

ALFONS OSTERSETZER, OF KLOSTERNEUBURG, AND FRANZ RIESENFELD, OF VIENNA, AUSTRIA, ASSIGNORS TO POLLOPAS LIMITED, OF NOTTINGHAM, ENGLAND, A COMPANY OF ENGLAND

MANUFACTURE OF PHENOL FORMALDEHYDE CONDENSATION PRODUCTS

No Drawing. Application filed May 18, 1929, Serial No. 364,312, and in Austria June 1, 1928.

This invention is drawn on the process of preparing phenol formaldehyde condensation products according to U. S. patent application Ser. No. 134,128 as well as U. S. application Ser. No. 263,205, now Patents 1,854,600 and 1,858,168, respectively, with which one may proceed with the condensation of 1 mol of phenol to approximately 2½ mols of formaldehyde in the presence of such a large amount of basic condensation materials that the resulting product does not precipitate, but remains in solution whereupon the solution is neutralized, acidified and distilled and the resulting resin is finally hardened. In using definite bases and acids according to U. S. patent application Ser. No. 263,205 one obtains products which are fully glass clear. These processes give products of desirable properties, not attainable by the prior practice since prior to this invention the finished article had a distinct and disagreeable formaldehyde odor.

The more or less strong smell of formaldehyde of the compositions hitherto obtained is due to the presence of free formaldehyde in the finished products. Owing to the presence of free formaldehyde, these products are unsuitable for uses in which there is a possibility of the free formaldehyde being dissolved in aqueous liquids, such as for instance in smoking requisites, for instance cigarette holders and the like.

Hitherto it has not been found possible to eliminate the free formaldehyde from the end products as the solution of this problem presents great difficulties. It has been found that nearly all those substances which could be used as formaldehyde binders are entirely unsuitable for the purpose.

If for the binding of the free formaldehyde are used for instance nitrogen-containing products such as phenyl-hydrazin, hydroxyl-amine, aniline or other aromatic amines, the composition or mass decomposes apparently completely, forms froth and is therefore quite unsuitable for practical purposes. The use of sulphites as formaldehyde binders is also quite out of the question as the composition then shows crystalline separations. Finally, the use of hydrocyanic acid is out of the question for obvious reasons.

It has been found now, that the binding of the free formaldehyde without any reduction of the quality of the end products in the processes in question, can be obtained by adding, according to the invention to the condensation solution, towards the end of the process of condensation or after the condensation is finished, phenols, carbamides or carbamide derivates, i. e. compounds having the characteristic urea grouping

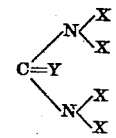

where X is hydrogen, aryl, alkyl or acyl and Y is sulphur or oxygen for the purpose of binding the free formaldehyde. The subsequent addition of the phenols or carbamides is effected therefore at a moment at which the condensation of the quantities of phenol and formaldehyde contained in the initial solution, is on the whole already finished.

The subsequent addition of phenols, carbamides or carbamide derivates can be made according to the invention also gradually or by degrees.

If as additions are used carbamides or carbamide derivates which are less easily decomposed in alkaline solution, such as for instance methyl-urea, acetyl-urea, diphenyl-urea and the like, these additions can be introduced into the condensation solution before the condensation is finished or at any desired moment, as in such a case there is no risk of any material decomposition of the added substances by the strongly alkaline solution.

According to a method of carrying out the process, the subsequent addition of phenol is calculated in such a manner as to obtain in the end a proportion of about 1 molecule phenol to 2½ molecules formaldehyde.

The substances mentioned in the foregoing can be used either alone or mixed with one another. The essential point is to make the addition in such a manner and in such quantities that the final condensation product shall contain no free formaldehyde or only practically negligible quantities of it.

As an initial solution for the present processes, the condensation solution prepared in accordance with United States specification No. 134,128 can be used, but more particularly the condensation solution according to United States specification Ser. No. 263,205 leading to glass clear products.

*Example 1*

1000 gr. carbolic acid, 3000 gr. formaldehyde (of 30%) and about 50 cc. $8n$ KOH are boiled with reflux for a short time, whereupon are added about 18 cc. $8n$ lactic acid and about 58 cc. phthalic acid anhydride or the corresponding quantity of phthalic acid dissolved in glycerin, and the whole distilled in a vacuum. At any desired point of the distillation 60 gr. urea are added, and the distillation completed. The mass is colored or clouded according to wish.

*Example 2*

1000 gr. carbolic acid, 3000 gr. formaldehyde (30%) and about 50 cc. $8n$ KOH are boiled for a short time with reflux, whereupon about 250 gr. carbolic acid are added in one lot or gradually, and the boiling is continued for a short time. Thereupon neutralization is carried out as stated in Example 1, the mass is distilled in a vacuum and hardened as usual.

In the products obtained in the Examples 1 and 2, the proportion of free formaldehyde has been reduced to such an extent that the compositions have practically no smell of formaldehyde either during treatment or in use.

*Example 3*

1000 gr. carbolic acid, 3000 gr. formaldehyde (of 30%) and 100 gr. $8n$ NaOH are heated with reflux. A strongly exothermic reaction takes place. Before the complete end of the reaction about 250 gr. carbolic acid are added at once or gradually, the boiling being continued for a short time. Then 100 gr. $8n$ monochloroacetic acid are added, and the distillation carried on in a vacuum until the product becomes clear. On being hardened, the product gives a resin with snow white clouds. For the purpose of increasing the breaking strength, about 400 gr. glucose can be added during the distillation.

The process according to the present invention can be modified and combined in various ways. For instance, to the condensation solution phenols and saccharides can be added, or phenols, carbamides and saccharides and so on.

The process of the present invention may be modified to various combinations of phenols, carbamides and carbamide derivatives as addition substances, and naturally these can be substituted by their homologues or their substitution products, their salts or such derivatives. It is obvious also that in the working solution instead of phenol, the homologues of phenol, and instead of formaldehyde, other aldehydes or their polymers may be used. Mixed resins of formaldehyde with phenols and carbamides or other known phenolic substances are known. The present invention differs from these known processes in that in the present invention these known processes condensation is carried out in the proportion of one mol of phenol to exactly 2½ mols of formaldehyde in a strong alkaline solution to completion, and the subsequent addition for the purpose of taking up of the free formaldehyde addition substances, with which the same results in solid condensation products. The end product shows various differences over known products in its fastness to light, as well as in the easy manner in which it may be worked, which approaches that of "Galalith". If the condensation solution is prepared according to the present invention, then fully glass-clear products may be obtained.

We claim:

A process for the manufacture of phenol formaldehyde condensation products which comprises condensing one mol of phenol with more than one mol of formaldehyde in a strongly alkaline solution and adding toward the end of the condensation a further quantity of phenol such that the total phenol stands in the molecular ratio of 2 to 5 with respect to the formaldehyde.

In testimony whereof we affix our signatures.

FRANZ RIESENFELD.
ALFONS OSTERSETZER.